UNITED STATES PATENT OFFICE.

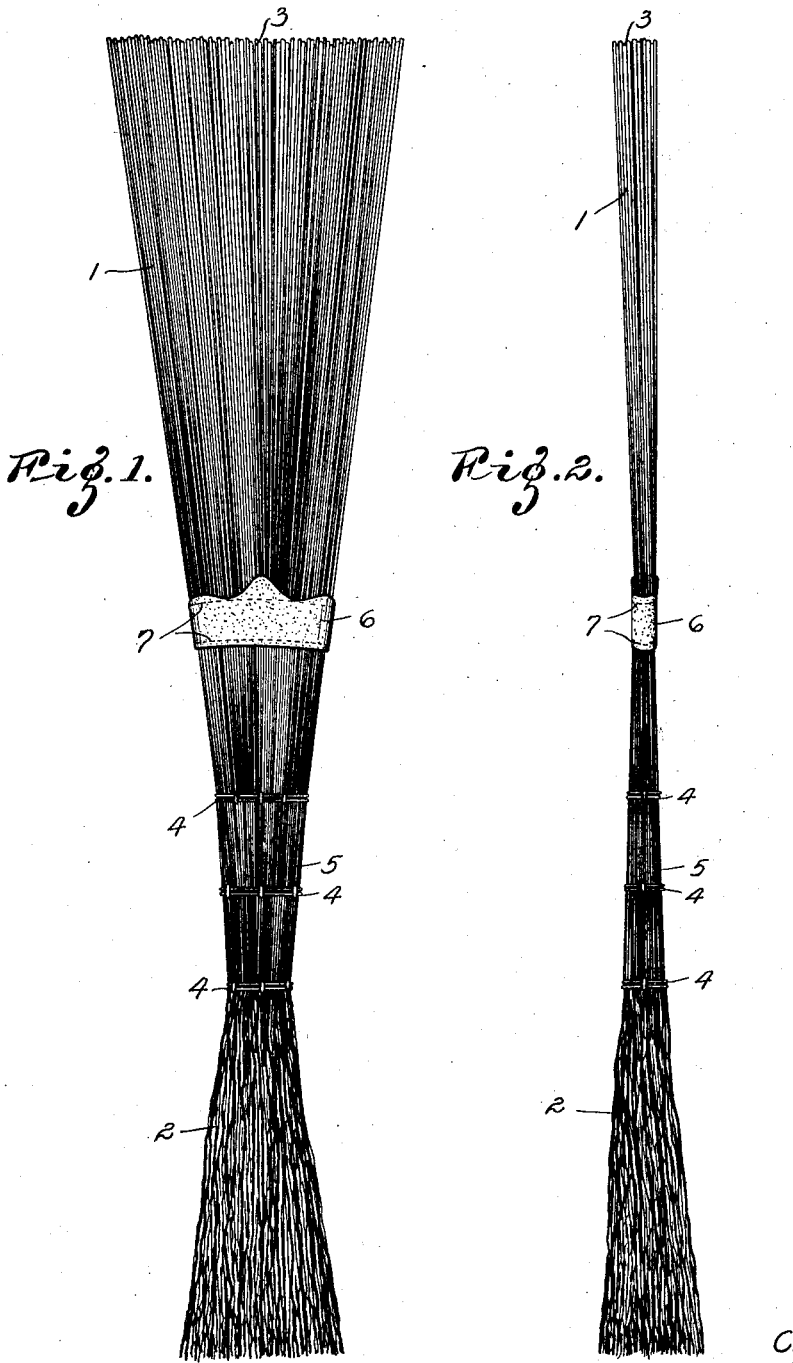

CONSTANCE A. RIEK, OF HERMANN, MISSOURI.

COMBINED FLY-SWATTER AND BRUSH.

1,393,571. Specification of Letters Patent. Patented Oct. 11, 1921.

Application filed May 2, 1921. Serial No. 466,065.

*To all whom it may concern:*

Be it known that I, CONSTANCE A. RIEK, a citizen of the United States, residing at Hermann, Missouri, have invented certain new and useful Improvements in Combined Fly-Swatters and Brushes, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved combined fly-swatter and brush, which shall be made of hurl broom straw, or other wisps, having the top end of the hurl arranged as a corner-brush, useful in cleaning dead flies and other rubbish out of corners, ruts or grooves; the larger end of the straws being used as the swatter, there being a series of two or more ties with broom-twine, to make a handle at a point intermediate of the swatter and brush, and the said swatter being flattened and held flat by an ornamental strip of colored oilcloth, leather, or velvet encircling or inclosing the straws of the swatter at a point near said handle, and sewed (or otherwise secured) in place by stitches or other fastening-means which passes through the flattened base of said swatter, and through the straws or wisps thereof, as well as through said binding-strip; whereby a device for the purposes mentioned will be produced at a very low cost, and yet be very light, neat, clean, and highly efficient in use.

In the drawings,

Figure 1 is a side-view of one form of my invention, and

Fig. 2 is an edge-view of the same.

The numeral 1 designates a bundle of hurl broom-straws or other wisps of hickory, bamboo or the like, having a tapered shape, thicker at one end than at the opposite end.

In the present illustration of my invention, I have shown the hurl broom-straws 1, having the top-end of the hurl arranged as a corner-brush 2, the larger ends of the straws being arranged as a swatter 3, and there being a series of ties with broom-twine 4 around and through the bundle of straws at a point where the said corner-brush is united to the base of said swatter, to round up the base of said brush, and to make a round or cylinder-like handle 5 thereat, which may be readily grasped by the fingers of one hand, in using the device for killing flies and other vermin or insects, as well as in using said corner-brush.

The broom-twine tie 4 that is at the base of the said swatter 3 is arranged to flatten the same, so that the swatter will be of fanshape, and comparatively flat and thin, as shown; but to still further flatten the swatter, as well as to present the same in a finished and ornamental form, I have inclosed the base of the swatter in an ornamental band 6 of colored oil-cloth, leather, or velvet, which is secured in place by stitches 7 or other fastening-means which pass through the flattened base of the swatter member of the device, as well as through the base of the swatter.

The swatter 3, as above described, is very durable and efficient, as the swatter-handle 5 and the brush 2 are virtually in one piece, and need never be taken apart or unjointed.

In use, in swatting a fly, there is more air-passage in my swatter than in any other swatter known to me, thereby permitting the movement through the air to be very quick, and insuring the catching of every fly struck at.

It is impossible to scratch or mar the polished surfaces of fine furniture with my swatter, as no metal is used in its construction.

The user can strike at a fly with full force, and kill it while it is sitting on any sharp edge or pointed projection, without injuring my swatter.

The user can kill a fly in a close corner with my swatter, and if it (the fly) is mashed, the brush 2 may be quickly used in cleaning up the mess.

Because of the switch-like form of my swatter, it is highly efficient; and if the user sees a fly sitting in a corner, or on an edge or pointed projection, he can strike and kill the fly, without waiting patiently for the fly to move to a more desirable position, or without coaxing it to do so.

While I prefer to manufacture my invention by using broom-corn, or broom-straws, as previously described; yet I do not limit myself to that material, as it is obvious that wisps or splints of hickory, bamboo, or other wood, or other material, can be used instead of broom-corn.

I claim:—

1. A fly-swatter having a swatting-body made of broom-corn straws bound together intermediate of their ends, to form a handle thereat; and a corner-brush formed at the end of said handle that is opposite the end to which said swatting-body is connected.

2. A combined fly-swatter and corner-brush, comprising a fan-shaped flat swatting-body made of broom-straws bound together intermediate of their ends, to form a handle thereat; and a corner-brush formed by the projecting free portions of said straws that are located at the end of said handle that is opposite the end that is attached to the said swatting-body.

3. A combined fly-swatter and corner-brush, made up of wisps or splints bound together, with their larger ends free; a handle at the inner portions of said splints or wisps; and an integral brush on said handle, formed by the free smaller ends of said wisps or splints.

In testimony whereof, I have signed my name to this specification in presence of two subscribing witnesses.

CONSTANCE A. RIEK.

Witnesses:
FERDINAND DIEDERICH,
O. G. RIEK.